219-121 SEARCH ROOM

Aug. 20, 1957 W. E. GLENN 2,803,738

WEAR RESISTANT CONTACT

Filed June 29, 1954

Inventor:
William E. Glenn,
by Paul A. Frank
His Attorney.

United States Patent Office 2,803,738

Patented Aug. 20, 1957

2,803,738

WEAR RESISTANT CONTACT

William E. Glenn, Schenectady, N. Y., assignor to General Electric Company, a corporation of New York Application June 29, 1954, Serial No. 439,997

17 Claims. (Cl. 219—121)

Figure 1:
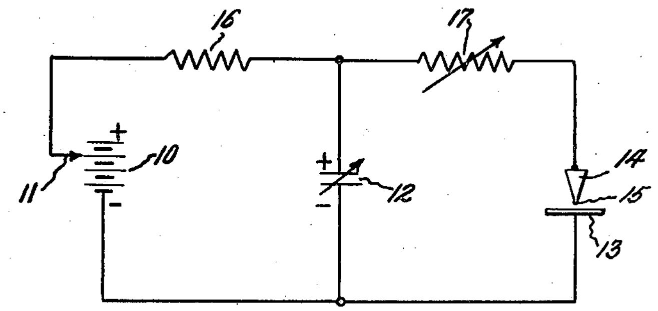

This invention relates to wear resistant contacts and methods of making the same. While this invention is subject to a wide range of applications, it is especially suited for forming wear resistant tips on phonograph record playing styli and will be particularly described in that connection.

A record playing stylus generally consists of a shank portion which is mechanically coupled to an electromechanically sensitive transducer and a tip portion which is customarily formed into a relatively fine point. The stylus is caused to follow the groove in a rotating phonograph record and the resulting mechanical motion of the stylus is transmitted through the shank to the electromechanically sensitive transducer to produce an electrical output. In order to provide an accurate reproduction of the recorded sound on the record, it is necessary that the needle or stylus have a fine point which is adapted to follow all variations in the groove path. A fine tip portion is subject to relatively high unit pressures and since the contact between the stylus tip and the record is a sliding friction contact, the wear on the tip of the stylus tends to be relatively high. This causes the point to be worn down into either a sharp edge which tends to damage the record or into a dull tip which does not follow accurately the record groove and results in poor sound reproduction.

A solution which has been advanced to solve this problem is to provide a stylus tip made of a hard wear resistant material such as a semi-precious gem. A stylus tip made of a hard material such as, for example, sapphire, is necessarily expensive to manufacture and difficult to fabricate. If the record contacting tip portion of the stylus made out of a gem is not carefully formed, the record wear will be excessive. Another method of solving this problem is to provide a wear resistant coating for the tip of a stylus. The coating may consist of hard particles embedded in the tip portion of the stylus or of an alloy coating formed by sintering or treating the tip portion in an atmosphere which will react with a material of the stylus to form a wear resisant compound. A stylus may also be made out of a hard wear resistant material.

Another approach which has been utilized is to use a stylus formed of a soft material, which, after a short period of time, will be formed into the shape of the record groove. A stylus of this type cannot be used for a long period of time and the quality of reproduction is relatively poor.

According to an aspect of this invention, there is provided a record playing stylus which is provided with a wear resistant tip which is so formed as to result in minimum record wear and which can be simply and economically produced.

It is, therefore, an object of this invention to provide an improved method of forming a rounded tip on a metal member.

Another object of this invention is to provide an improved method of producing a wear resistant contact.

It is also an object of this invention to provide a record playing stylus with an improved wear resistant tip portion.

This invention provides a method of forming a rounded surface on a metal member. The method comprises the steps of heating the member to melt a portion of the metal of the member and then cooling the molten metal so that the outer surface of the molten metal is last in point of time to solidify. In this manner the surface tension inherently present in the molten metal causes the metal to form around the partially solidified core in a rounded substantially hemispherical form having a smooth polished outer surface.

Figure 2:
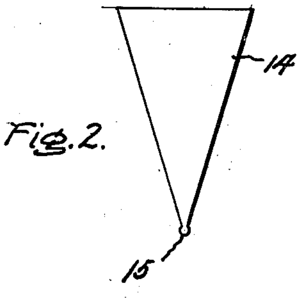
Figure 3:
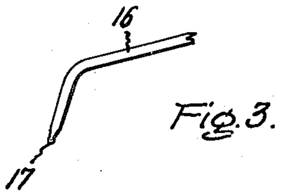

In order to obtain a better understanding of this invention, reference is made to the figures of the drawing in which Fig. 1 illustrates an example of an apparatus which may be used in the practice of this invention and Figs. 2 and 3 are examples of record playing styli with wear resistant tips formed in accordance with this invention.

Fig. 1 illustrates in schematic form a power supply 10, the voltage of which may be varied by movement of contact 11, a capacitor 12 connected in series parallel with the source of power 10, plate 13 and stylus 14 with tip 15. The stylus 14 and plate 13 are adapted to be momentarily connected across capacitor 12 by touching tip 15 to plate 13. The circuit of Fig. 1 may also be provided with current limiting resistor 16 and adjustable current controlling resistor 17. In this particular embodiment which is given merely by way of example, the power supply 10 is a 90 volt direct current power supply, resistor 16 is a 500,000 ohm resistor, capacitor 12 is a 5 microfarad capacitor and current control resistor 17 is a 50 ohm resistor.

The power supply 10 charges capacitor 12 to a voltage equal to the voltage of power supply 10. When stylus 14 is moved toward plate 13, so that point 15 momentarily contacts the plate, an arc discharge is formed between point 15 and plate 13. The arc produces a high temperature in the region of point 15 which is sufficient to melt most known metals. The duration of the discharge and the instantaneous heat produced are determined by the size of capacitor 12, the size of resistor 17 and the voltage applied across capacitor 12. If the size of current controlling resistor 17 is made relatively small the magnitude of the current flow will be relatively high but of short duration. Conversely, if the value of resistor 17 is made relatively high the value of the current flow will be low and the duration thereof relatively long. The capacity of capacitor 12 determines the amount of electrical energy which is available to heat the tip of stylus 14.

The heating of tip 15 is most effective when it is subject to electron bombardment; therefore, the circuit of Fig. 1 illustrates stylus 14 coupled so that it is at a positive potential with respect to plate 13. If it is desired to heat stylus 14 by ion bombardment, the connections on power supply 10 are reversed. It is to be noted that this particular apparatus for heating is described merely by way of example and is not to be considered limiting since the method and product of this invention may be obtained with a variety of equipments.

The general method of this invention will be described in conjunction with the apparatus illustrated in Fig. 1 of the drawing. A triangular stylus, such as stylus 14 illustrated in Fig. 2 of the drawing, is connected to the positive terminal of capacitor 12. The plate 13 is connected to the negative terminal of capacitor 12 and an inert atmosphere such as, for example, helium, argon, neon, or krypton is provided in the region of the stylus and the metal plate. The capacitor is discharged by touching the tip 15 of stylus 14 to the plate 13 thereby forming an arc discharge and melting the tip portion of the stylus. The stylus is then allowed to cool. The relatively large area of the stylus relative to the area of the tip portion causes the center or core portion of the stylus to cool much more rapidly by conduction than the surface of the tip portion is cooled by radiation. Therefore, the core will solidify before the outer surface of the molten metal and the surface tension of the molten metal forms a rounded or substantially hemispherical surface on the tip portion such as that illustrated in Fig. 2 of the drawing.

This method may be applied to any metal stylus such as a stylus made of iron, cobalt, titanium, tantalum or any other metals customarily used to make metal phonograph styli. The stylus may take the form of Fig. 2 which consists of a triangular shape sheet of metal or it may take the configuration of the stylus illustrated in Fig. 3 which consists of a metal wire shank 16 with a substantially hemispherical tip portion 17.

The hemispherical tip portion of the stylus is then reheated in an atmosphere of a reactive element to form a wear resistant compound of the metal of the stylus at the surface of the tip. By way of example, a titanium stylus may have a substantially hemispherical tip portion formed in accordance with the method of this invention.

In accordance with this embodiment of my invention, the stylus is reheated to a temperature of approximately 1000° C. in a reactive atmosphere, for example an atmosphere including a high concentration of the element carbon, such as methane gas, for a sufficient period, for example a period from 2 to 10 minutes, for the carbon in the methane to combine with the titanium to form titanium carbide at the surface of the tip portion.

By following this general method and reheating in an atmosphere containing the element boron, for example a mixture of boron powder and alumina or boron tetrachloride mixed with dry hydrogen, a titanium boride surface is obtained. Similarly, heating in an atmosphere containing the element nitrogen results in the formation of titanium nitride at the surface. It is to be understood that the metals and the hardening elements are given merely by way of example and are not to be considered limiting since a rounded tip formed in accordance with this invention may be made wear resistant in any fashion that does not destroy or deform the smooth substantially hemispherical tip.

In the practice of this invention it is essential that the outer surface of the molten metal, which may be formed by any satisfactory means that heats a limited area of an elongated member such as a phonograph stylus, be last in point of time to solidify so that the surface tension of the cooling molten metal will form the outer surface into a smooth, polished rounded surface.

It is well known that metals from the tungsten group which include tungsten, molybdenum and chromium form extremely hard wear resistant carbides. Carbides of these metals which have a lower melting point than the metal, are particularly well adapted for use as hard wear resistant surfaces formed in accordance with this invention. An adaptation of this invention will be described in conjunction with the apparatus of Fig. 1 and in particular with a metal from the tungsten group which has a carbide which melts at a lower temperature than the pure metal.

A tungsten stylus 14 is coupled to the negative terminal of capacitor 12 and a plate 13 which may consist, for example, of either graphite or tungsten is connected to the positive terminal of capacitor 12. A small drop of a material having a high concentration of the element carbon, such as, for example, benzene, is placed on the surface of plate 13. The stylus 14 is momentarily touched to the plate 13 at the point where the drop of benzene is located. This results in a high current arc and ion bombardment heating of the tip of stylus 14. The ion bombardment results in a relatively complete reaction between the benzene atmosphere which is created by the arc and the tungsten and forms a small region of tungsten carbide at the tip of stylus 14. This reaction may be described in a general manner by the equation given below.

$$\begin{array}{ccc} C_6H_6 & \longrightarrow & 6C + 3H_2\uparrow \\ & & \downarrow \\ W + C & \longrightarrow & WC \end{array} \qquad (1)$$

The ion bombardment with the stylus negative with respect to the plate 13 results in effective combination of the carbon and tungsten but in relatively poor heating.

The circuit connections are reversed so that the stylus is positive with respect to the plate 13 and another drop of benzene is placed on plate 13. The stylus is momentarily touched to plate 13 resulting in an arc discharge and electron bombardment heating of the tip 15 which causes the tungsten carbide to melt along with a portion of the tungsten in the stylus 14. Tungsten carbide has a lower melting point than pure tungsten and therefore will be last in point of time to solidfy, such that the surface tension of the outer portion of the molten metal will form into a substantially hemispherical tip portion 15 on stylus 14.

This adaptation of the basic method of the invention results in a polished substantially hemispherical tip portion with a wear resistant surface of tungsten carbide. It will be readily appreciated by those skilled in the art that the method just described may be readily applied to a stylus or metal member of molybdenum or chromium which have carbides which melt at a lower temperature than the metal. It also will be appreciated that this method may be applied to form a rounded portion on a member of a metal or combination of metals which, when heated in a reactive atmosphere, forms with an element in the atmosphere an alloy or metal compound which has a lower melting point than the metal or metals of the shank portion of the member.

This invention provides an economical and effective method of producing hard wear-resistant contacts and the embodiments of this invention which are particularly described are given merely by way of example of the numerous and varied forms and materials to which this invention may be applied.

What I intend to claim by Letters Patent of the United States is:

1. The method of forming a smooth spherical tip on an elongated metal member which method comprises melting an end portion of said member and progressively solidifying the molten portion beginning with an internal volume and ending with a volume at the surface of the molten portion so that the outer molten surface is last in point of time to solidify.

2. The method of forming a smooth spherical tip on an elongated metal member which method comprises melting an end portion of said member, progressively solidifying the molten portion beginning with an internal volume and ending with a volume at the surface of the molten portion so that the outer molten surface is last in point of time to solidify and reheating said end portion in a reactive atmosphere which combines with said metal to form a wear resistant tip.

3. The method of forming a smooth spherical tip on an elongated metal member which method comprises melting an end portion of said member, progressively solidifying the molten portion beginning with an internal volume and ending with a volume at the surface of the molten portion so that the outer molten surface is last in point of time to solidify and reheating said end portion in a reactive atmosphere including a carbon compound to form a carbide of said metal at said tip.

4. The method of forming a smooth spherical tip as defined in claim 3 wherein said carbon compound is methane.

5. The method of forming a smooth spherical tip on an elongated metal member which method comprises melting an end portion of said member, progressively solidifying the molten portion beginning with an internal volume and ending with a volume at the surface of the molten portion so that the outer molten surface is last in point of time to solidify and reheating said end portion in a reactive boron atmosphere to form a boride of said metal at said tip.

6. The method of forming a smooth spherical tip on an elongated metal member which method comprises melting an end portion of said member in a reactive atmosphere and progressively solidifying the molten portion beginning with an internal volume and ending with a volume at the surface of the molten portion so that the outer molten surface is last in point of time to solidify.

7. The method of forming a smooth spherical tip on an elongated metal member which method comprises melting an end portion of said member in an inert gas, progressively solidifying the molten portion beginning with an internal volume and ending with a volume at the surface of the molten portion so that the outer molten surface is last in point of time to solidify and reheating said end portion in a reactive atmosphere which combines with said metal to form a wear-resistant surface at said tip.

8. The method of claim 7 wherein said atmosphere contains a high concentration of carbon so that a carbide of said metal is formed at said tip.

9. The method of claim 7 wherein said end portion is reheated to a temperature of 1000° C. in a methane atmosphere to form a carbide of said metal at said tip.

10. The method of claim 7 wherein the atmosphere contains a high concentration of the element boron to thereby form a boride of said metal at said tip.

11. The method of claim 7 wherein said atmosphere contains a high concentration of the element nitrogen to thereby form a nitride of said metal at said tip.

12. The method of forming a hard, smooth spherical tip on an elongated metal member which comprises melting an end portion of said member by striking an electric arc between said end and an electrode, progressively solidifying the molten portion beginning with an internal volume and ending with a volume at the surface of the molten portion so that the outer molten surface is last in point of time to solidify and reheating said end portion in a reactive atmosphere to obtain a wear-resistant tip.

13. The method of forming a wear resistant smooth spherical tip on an elongated metal member which comprises melting an end of said member in a reactive atmosphere by striking an electric arc between said end and an electrode, and progressively solidifying the molten portion beginning with an internal volume and ending with a volume at the surface of the molten portion so that the outer surface of the molten metal is last in point of time to solidify.

14. The method of forming a wear resistant smooth spherical tip on an elongated metal member including at least one metal from the tungsten group which comprises melting an end portion of said member in a reactive atmosphere by striking an electric arc between said end and an electrode, and progressively solidifying the molten portion beginning with an internal volume and ending with a volume at the surface of the molten portion so that the outer surface of the molten metal is last in point of time to solidify.

15. The method of claim 14 wherein said end portion is melted in an atmosphere containing a high concentration of the element carbon to thereby form a carbide of said metal at said tip.

16. The method of forming a smooth, spherical, wear resistant surface on an elongated metal member, which method comprises heating an end portion of the member below the melting point of the metal in a reactive atmosphere which combines with the metal to form a wear resistant surface by striking an arc between the end portion and a positive electrode, melting the end portion by striking an arc between the end portion and a negative electrode, and progressively solidifying the molten portion beginning with an internal volume and ending with a volume at the surface of the molten portion.

17. The method of forming a smooth, spherical, wear resistance surface on an elongated metal member including at least one metal from the tungsten group, which method comprises heating an end portion of the member below the melting point of the metal in an atmosphere including a form of carbon which combines with the metal to form a wear resistant carbide compound of the metal at the surface of the end portion by striking an arc between the end portion and a positive electrode, melting the end portion by striking an arc between the end portion and a negative electrode, and progressively solidifying the molten portion beginning with an internal volume and ending with a volume at the surface of the molten portion.

References Cited in the file of this patent

UNITED STATES PATENTS

| | | |
|---|---|---|
| 903,860 | Howell | Nov. 17, 1908 |
| 1,162,149 | Eckhardt | Nov. 30, 1915 |
| 1,162,285 | Eckhardt | Nov. 30, 1915 |
| 1,741,256 | Taylor | Dec. 31, 1929 |
| 2,050,416 | Blanchard | Aug. 11, 1936 |
| 2,053,407 | Pfanstiehl | Sept. 8, 1936 |
| 2,145,276 | Pfanstiehl | Jan. 31, 1939 |